US Patent [19] Jackson

[11] Patent Number: 4,972,874
[45] Date of Patent: Nov. 27, 1990

[54] POWER-OPERATED VALVE

[75] Inventor: Harold E. Jackson, South Brent, United Kingdom

[73] Assignee: Evalve Limited, St. Helier, Channel Islands

[21] Appl. No.: 448,281

[22] Filed: Dec. 11, 1989

[30] Foreign Application Priority Data

Dec. 13, 1988 [GB] United Kingdom ............... 8829044

[51] Int. Cl.⁵ .............................................. F16K 31/12
[52] U.S. Cl. .................. 137/550; 251/30.05; 251/45
[58] Field of Search ............... 137/550; 251/45, 46, 251/30.02, 30.04, 30.05

[56] References Cited

U.S. PATENT DOCUMENTS 3,022,039  2/1962  Cone et al. ...................... 251/46
3,544,062 12/1970  Murray ............................ 251/45
4,073,464  2/1978  Hansen et al. ................ 251/30.02
4,235,414 11/1980  Lis .................................. 251/46

Primary Examiner—A. Michael Chambers
Attorney, Agent, or Firm—Thomas J. Greer, Jr.

[57] ABSTRACT

In a power-operated valve in which the pressure of a working fluid is used to control the opening and closing of the valve member in dependence on the condition of an integral power-operated bleed valve, a compensation passage being formed in the valve member to permit working fluid to close the valve when the bleed valve is closed, the compensation passage is formed in that area of the valve member which is bounded by the valve seating and which also defines the cross-sectional area of the inlet chamber, whereby the closing force on the valve member is proportional to the area of the valve housing, thus enhancing the sensitivity of the valve. In a preferred embodiment, a filter is incorporated in the valve member to filter the working fluid to the compensation passage without filtering the bulk of fluid passing through the valve.

4 Claims, 1 Drawing Sheet

POWER-OPERATED VALVE

This invention relates to power-operated valves of the type wherein the pressure of a working fluid passing through the valve is used to control the opening and closing of the valve in dependence on the condition of an integral power-operated bleed valve.

Known valves of the above type generally comprise a valve member, typically a resilient diaphragm, which is movable in a housing and co-acts with a central annular seating. The valve inlet chamber generally surrounds the seat and the outlet chamber is within the confines of the seating; movement of the valve member in and out of engagement with the seating to control the flow of working fluid from the inlet to the outlet chambers is effected by varying the pressure on one side of the valve member by the action of flow of the working fluid through an orifice acting as a compensation passage formed in the valve member and an associated bleed valve the condition or operation of which is controlled by a solenoid or other power means. The diameter of the bleed valve is greater than that of the compensation passage such that, on opening of the bleed valve, a differential pressure is developed across the valve member whereby the valve member is raised off the seating to permit fluid to flow. The compensation passage is formed in the area of the valve member corresponding to the inlet chamber and hence the closing force which urges the valve member or at least the central part thereof against the seating when the bleed valve is closed is proportional to the cross-sectional area of the outlet chamber. It is of course an inherent limitation of valves of this general type that they require a certain minimum pressure difference between the inlet and outlet chambers to function properly and, because of the limitation imposed by the dependence of the closing force on the area of the outlet chamber, it has not hitherto been possible to increase the sensitivity of valves of this type by changing the dimensions of the valve member or its housing.

A further limitation with valves of this type is that foreign matter entrained in the working fluid may block the narrow compensation passage. With known arrangements, it has not hitherto been possible to filter the working fluid to the compensation passage without at the same time filtering the main flow through the valve, with the resulting possibility that the filter may become blocked thus restricting or stopping the flow.

It is an object of the present invention to provide a power-operated valve of the above type, in which the known disadvantages are reduced or avoided.

According to the invention, a power-operated valve as hereinbefore described is characterised in that the compensation passage is formed in the valve member in that area bounded by the valve seating, which area also defines the cross-sectional area of the inlet chamber, whereby the closing force is proportional to the area of the valve housing or to that part of the housing delimiting the cross-sectional area of the outlet chamber.

According to one embodiment of the invention, the inlet and outlet chambers are mounted side by side within a housing and the cross-sectional area of the outlet chamber is selected to be larger than that of the inlet chamber. However, it is preferred that the inlet chamber is formed in a central part of the housing and the outlet chamber is annular and surrounds the inlet chamber, thereby providing the required differential area between the respective parts of the valve member to enhance the sensitivity of the valve and enable it to function properly at lower differential pressures between the inlet and outlet chambers.

Preferably the valve member comprises a resilient diaphragm peripherally mounted in the housing and preferably includes a thickened or reinforced section across the inlet chamber through which the compensation passage is formed.

In a valve according to the present invention, the bleed valve may communicate with the outlet chamber via a by-pass conduit which may be formed within the housing.

According to a preferred embodiment, in a valve according to the invention, the valve member is provided with filter means in communication with the compensation passage and upstream thereof, whereby the working fluid passing through the compensation passage is filtered without needing to filter the entire flow of working fluid passing through the valve. Preferably the filter means is mounted within the valve member. Conveniently, where the valve member is constituted by a resilient diaphragm, the filter means is carried within the thickened or reinforced part thereof.

In a further optional embodiment, restraining or support means are provided to prevent excessive distension or deformation of the diaphragm, in particular of the non-thickened annular portion thereof, which might otherwise cause the diaphragm to rupture under pressure.

Valves according to the invention are suitable for a wide variety of applications but are particularly suited as control valves in central heating systems, especially since they do not close sharply, thereby tending to avoid water hammer.

Embodiments of the invention will now be described by way of example with reference to the accompanying drawings, of which:

Figure 1:
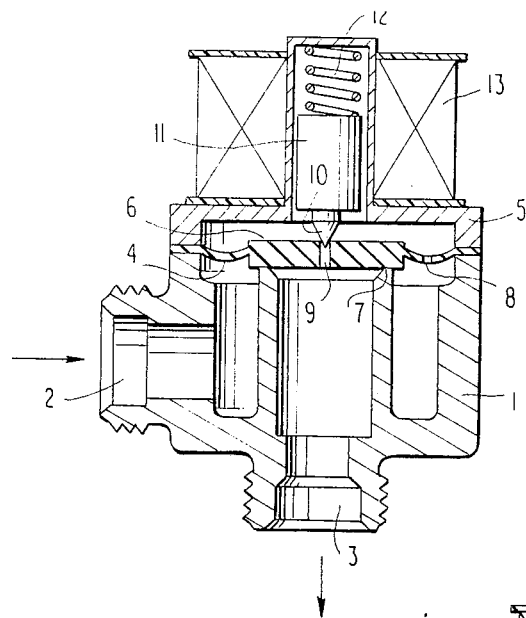
FIG. 1 shows an existing type of power-operated valve.

Referring to FIG. 1, which shows a previously known valve, a body 1 is provided with an inlet port 2 and an outlet port 3. A diaphragm 4 is clamped at its periphery against the body by a plate 5 and, at its centre, has a thickened ring 6 which can form with a seating 7 a valve member to permit or prevent flow between the inlet and the outlet ports. An orifice 8 is pierced through the diaphragm between the seating and the body wall, to act as a compensation passage. The thickened centre of the diaphragm is pierced by a hole 9 into which the tapered extension 10 of an armature 11 can enter, to act as a bleed valve. The armature is loaded by a spring 12 and slides in a housing formed as an extension of the plate 5. The armature can be impelled by magnetic force induced by current in a coil 13 to move in a direction to open the bleed valve.

In operation, when the coil is not energised, fluid is driven under the inlet pressure through the orifice 8 into the chamber above the diaphragm bounded by the plate 5 from where it cannot escape because the bleed valve is closed. There is then a net downward force on the diaphragm driving its centre on to the seating 7 to prevent flow through the main valve.

When the coil is energised, the armature is drawn upwards taking its tapered extension out of engagement with the edge of the hole 9 and relieving the pressure above the diaphragm to that existing at the outlet of the main valve. There is then a net upward force on the diaphragm which moves away from the seating 7 and allows flow through the main valve.

Considering the condition when the bleed valve is closed;

If $P_1$ is the inlet pressure $P_2$ is the outlet pressure

A is the total effective area of the diaphragm and a is the area of the seating;

then the net closing force on the diaphragm is $(P_1-P_2) \times a$.

Figure 2:
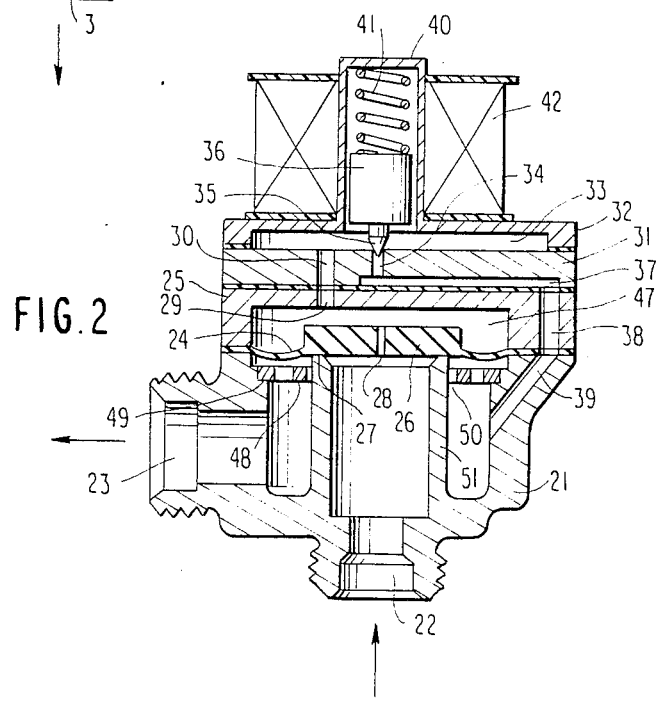
FIG. 2 shows a valve made in accordance with the invention.

Referring to FIG. 2, which shows a valve made in accordance with the invention, a body 21 is provided with an inlet port 22 and an outlet port 23. A diaphragm 24 is clamped at its periphery to the body by a plate 25 and at its centre has a thickened ring 26 which can form with a seating 27 a valve member to permit or prevent flow from the inlet to the outlet ports. An orifice 28 is pierced through the thickened centre portion of the diaphragm, to act as a compensation passage. A cavity 47 formed in plate 25 forms a chamber above the diaphragm and holes 29 and 30 through plates 25 and 31 communicate with a cavity 33 in plate 32. A hole 34 in the upper part of plate 31 together with the tapered extension 35 of an armature 36 form a bleed valve. Flow through the bleed valve will pass via passage 37 and a by-pass conduit constituted by channels 38 and 39 in the body to the outlet port. Cavity 47, holes 29 and 30, cavity 33, hole 34, passage 37, and channels 38, 39 all define a fluid bypass from valve compensation passage 28 to outlet port 23. This fluid bypass is opened and closed by bleed valve 35 acting on hole 34. The armature slides in the extension 40 of plate 32 and is urged downward to close the bleed valve by a spring 41. The armature can be impelled upwards by the electromagnetic force induced in it when the coil 42 surrounding the extension 40 is energised. The tapered extension 35 is then drawn out of engagement with the hole (34) so that the bleed valve is open.

In operation, when the coil is not energised, fluid passes from the inlet via the orifice 28 into cavity 47 from which it cannot escape because the bleed valve is closed. As the upper surface of the diaphragm is then exposed to the inlet pressure while part of its lower surface is exposed to the outlet pressure, there is a net force downward driving the diaphragm against the seating 27 and shutting off the flow through the main valve.

When the coil is energised, the bleed valve is opened and the pressure above the diaphragm is relieved to substantially that of the outlet port. There is then a net force upwards on the diaphragm opening the main valve.

Considering the condition when the bleed valve is closed:

If $P_1$ is the inlet pressure, $P_2$ is the outlet pressure,

A is the effective area of the diaphragm and a is the area of the seating;

then the closing force on the diaphragm is $(P_1-P_2) \times (A-a)$.

It can readily be understood that if $(A-a)$ is greater than a, the closing force in a valve according to this invention is larger than the closing force in known valves. For example, if $A=3 \times a$, the force is $2 \times a$, which is twice the force in known valves.

Figure 3:
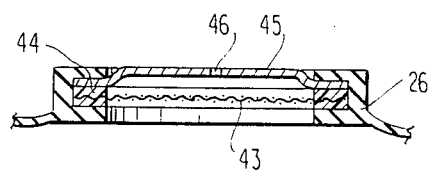
FIG. 3 shows an enlarged fragmentary view of a modified valve according to the invention.

Referring to FIG. 3, which shows the incorporation of a filter, an enlarged section of the thickened ring 26 of the diaphragm 24 includes a filter disc 43 which may be of woven material and has preferably moulded around its periphery a ring 44 of material more rigid than that of the diaphragm. Above the filter disc is situated a dished plate 45 also of more rigid material. The ring 26 of the diaphragm is formed with an annular cavity into which the filter and the dished plate are sealingly located. The dished plate is pierced by an orifice 46, which in operation performs the same function as the compensation passage 28 in FIG. 2. It will be understood that only the relatively small flow through the orifice 46 passes through the filter disc while the main flow through the valve passes unimpeded. Thus the object of protecting the orifice 46 from blockage by foreign matter while allowing the main flow to pass unimpeded is achieved by simple means and without adding to the dimensions of any part of the valve assembly.

In some applications for a valve according to this invention, it will be required that the pressure drop across the valve when open should be small. This, in turn, requires that the diaphragm shall be very flexible. Very flexible materials commonly offer low resistance to severe deformation or even bursting under pressure. In order to protect the diaphragm from such deformation or bursting, a further feature is introduced into the valve and illustrated in FIG. 2, in which a ring 48, of relatively rigid material, is provided under the diaphragm 24 and rests against a ledge 49 in the body 21. The ring 48 is preferably made from perforated sheet, the perforations being of sufficient total area to allow negligible interference with the main flow through the valve. In operation, when the valve is closed, if the difference between the inlet and outlet pressures is high, the diaphragm is pressed against the ring 48 which supports it against excessive deformation or bursting. Alternatively, the ring may be of solid material and a gap 50, between the inner surface of the ring and the outer surface of an extension 51 of the inlet port 22, provides for the main flow through the valve.

Although for the purposes of illustration the operation of the bleed valve has been described as being controlled by a solenoid, the invention is not restricted to such control. It is equally applicable to valves in which the bleed valve is controlled by manual, hydraulic, mechanical or other electrical power means.

I claim:

1. A power-operated valve of the type having a housing, a valve member comprising a resilient diaphragm peripherally mounted in the housing, the valve having a compensation passage extending therethrough, the diaphragm including a thickened, integral section across the inlet chamber, the compensation passage being formed in said thickened section, the valve member movable in the housing and coacting with a seating in the housing, said seating separating inlet and outlet chambers within the housing, the inlet chamber formed in a central part of the housing and the outlet chamber being annular and surrounding the inlet chamber, the compensation passage formed in that area bounded by the valve seating, movement of the valve controlling the flow of fluid from the inlet to the outlet chamber by varying the pressure on one side of the valve member by the action of flow of fluid through the compensation passage and a bleed valve controlled by power means, a bypass between the compensation passage and the outlet chamber, said bypass opened and closed by said bleed valve, the closing force on the valve member being proportional to the upper area of the valve member exposed to fluid pressure in the valve closed position minus the cross sectional area of the valve seating, a filter within the thickened portion of the diaphragm.

2. A valve according to claim 1 wherein the filter is provided with a peripheral ring of rigid material.

3. A valve according to claim 1 further including a restraining ring located below the diaphragm and around the inlet chamber, to thereby prevent excessive distension or deformation of the diaphragm in its valve closed position.

4. A valve according to claim 1 in which the bleed valve is controlled by a solenoid.

* * * * *